Patented Aug. 14, 1945

2,382,298

UNITED STATES PATENT OFFICE 2,382,298

PROCESS FOR PEBBLING AMMONIUM NITRATE

Richard C. Datin, Petersburg, Va., assignor to The Solvay Process Company, New York, N. Y., a corporation of New York No Drawing. Application May 6, 1942,
Serial No. 441,963

10 Claims. (Cl. 71—64)

This invention relates to a process for the production of a pebbled ammonium nitrate and, more particularly, to the treatment of a pebbled ammonium nitrate containing moisture to dry it.

Numerous processes have heretofore been known for pebbling ammonium nitrate melts to obtain a product of desired granule size. United States Patent No. 1,613,334 of January 4, 1927 to Ernest M. Symmes, discloses spraying a concentrated solution of ammonium nitrate into air. The sprayed particles are solidified while falling freely through the air. The solidified material is collected and then passed through a rotary drier in countercurrent contact with heated air. United States Patent No. 2,079,324 of May 4, 1937, to Carl Krauch et al., discloses spraying into cooling air hot 90% or stronger ammonium nitrate solution containing finely divided calcium carbonate to form solid granules. The solidified material may be heated in a current of air at, for example, 80° to 100° C. to dry it and expel any free ammonia. British Patent 309,299 to Christopher C. Smith et al., accepted April 11, 1929, discloses spraying or atomizing a hot concentrated solution of ammonium nitrate mixed with chalk down a tower in contact with cold air. The spherical particles solidify during their descent through the air. The granular material collected at the base of the tower is removed to a rotary drier where the residual water is expelled to give a product containing 0.2% or less moisture.

A common characteristic of all such processes is that a molten ammonium nitrate is dispersed into a cooling gas and allowed to fall freely through the gas until the particles are solidified sufficiently to retain the desired pebbled form after being collected and while being subjected to any desired subsequent treatment. In this specification and appended claims, when reference is made to a process for "pebbling ammonium nitrate" or to "a pebbled ammonium nitrate," those terms are used to identify such a process for forming agglomerates of ammonium nitrate and to agglomerates of ammonium nitrate which are the product of that type of process. The terms "ammonium nitrate melts" and "pebbled ammonium nitrate" as used herein are not limited to materials containing only ammonium nitrate. They include also melts and pebbles in which materials other than ammonium nitrate may be present but the ammonium nitrate melt constitutes the continuous phase in which the other materials are dispersed. Such other materials may be, for example, calcium carbonate, limestone, dolomite, etc., as finely divided solid dispersed in the ammonium nitrate melt.

The latter two patents referred to above and United States Patent 2,118,438 of May 24, 1938, to Lawrence and Maude, disclose the use as fertilizers of ammonium nitrate containing finely divided inert solid materials such as calcium carbonate, limestone, dolomite, etc., which may be produced by the process of my invention.

In operating pebbling processes of the type described above to pebble ammonium nitrate melts containing water, collecting the solidified pebbles after their free fall through the air, and then heating the pebbles to evaporate residual water and obtain a substantially dry product, it was found the pebbles tended to case-harden in the drier; i. e., form a hard, relatively impervious surface coating. This case-hardening resulted in its being difficult to dry the material. If vigorous drying conditions were used the pebbles tended to break down, destroying the desired granular condition. The surface of many of the pebbles took on a blistery appearance. This blistering was caused by formation on the surface of soft deposits of ammonium nitrate. If, in order to avoid these difficulties, mild drying conditions were employed, the time required for drying the pebbled material was greatly lengthened.

I have discovered that the foregoing difficulties in the drying of pebbled ammonium nitrate could be overcome by cooling the pebbled material to a temperature below 32° C. before it is dried at temperatures above 32° C. However, the dispersed melt of ammonium nitrate quickly forms a solid, hard surface, after which the rate of heat transfer from the interior of the still hot pebbles to the cooling gas is quite slow. Because of this, for commercial production of pebbles of a desired size (for example, 25% or more of the pebbled material retained on a 20 mesh screen), I found it economically impracticable to provide vigorous enough cooling and sufficiently high towers to give the pebbles time to be cooled to below 32° C. while freely falling through the cooling gas.

Accordingly, my invention comprises pebbling ammonium nitrate melts containing water by dispersing such melts into a cooling gas and collecting the pebbles after they have been solidified sufficiently to retain the pebbled form but while they are still at temperatures above 32° C. The temperature of the collected pebbles may be determined by allowing a mass of the pebbles to stand under adiabatic conditions until it is all at a uniform temperature and then measuring this uniform or equalized temperature of the mass. The solidified pebbles, after being collected, are cooled to a temperature below 32° C., preferably to about 25° C. The cooled pebbles are then dried at a temperature above 32° C., e. g., at 50° to 130° C.

The following example is illustrative of the processes of this invention:

A concentrated ammonium nitrate melt containing water is mixed with finely divided dolomite in the ratio (by weight, dry basis) of about 60 parts ammonium nitrate and 40 parts dolomite. The water in the melt is sufficient for the mixture to contain about 4% to 6% water. This melt of ammonium nitrate containing dolomite is dispersed at 110° C. to 133° C. into a current of air flowing upwardly through a tower. The air is introduced to the bottom of the tower at ordinary atmospheric temperatures. The degree of dispersion of the melt is such that about 40% or more of the solidified pebbles as collected from the cooling gas will be retained on a 10 mesh screen. The dispersed droplets fall freely through the air and are cooled to a temperature in the range 50° to 70° C. by the time they strike a collecting hopper positioned about 80 feet below the point at which the melt is dispersed into the air. The particular temperature in the above range at which the pebbles are collected will depend upon the mesh size of the pebbles, the prevailing temperature of the air entering the pebbling tower and the rate with which the air is passed in countercurrent to the falling particles.

The particles after being collected from their free fall through the cooling air are passed into a rotating drum. In this drum they are agitated and treated with cool air introduced to the rotating drum at a temperature of about 20° C. and passed countercurrent to the pebbles flowing from one end of the drum to the other. The pebbles leaving the drum are at about 25° C. They still contain about 3.0 to 5.5% moisture.

The thus cooled pebbles are transferred to a drier in which they are contacted with air heated to 50° to 130° C., e. g., to 125° to 130° C. before entering the drier. This drier may be a rotating drum similar in construction to the cooler in which the pebbles were cooled or any other suitable type of drier for the treatment of a solid, granular material to dry it. In passing through the drier the moisture content of the pebbles is reduced to about 0.3%. It has been found that with the pebbles cooled to below 32° C. prior to the drying, their moisture content may be reduced from about 4% to 0.3% in about 50 minutes treatment with heated air. The resulting dried pebbles are in good physical condition.

Prior to my invention, when ammonium nitrate-dolomite pebbled in the manner described above and without the cooling step, was dried by treatment with air at high enough temperatures for the moisture to be reduced to below 1% in less than 70 minutes, much of the pebbled material was broken or blistered by the drying. In attempting to obviate this difficulty by a milder drying treatment of the pebbled material, the removal of moisture became so slow that after drying for 70 minutes the pebbles still contained 1% or more moisture.

The difficulties in drying caused by case-hardening of ammonium nitrate granules appears to be peculiar to pebbled melts of ammonium nitrate and my invention is, therefore, peculiarly applicable thereto. Thus, ammonium nitrate melts solidified on cooled rollers have shown no tendency to case-harden when dried even though not first cooled to temperatures below 32° C. Nor is the process of my invention applicable to the treatment of ammonium nitrate in which the individual particles are essentially single crystals as distinguished from pebbles. Ammonium nitrate crystals recovered by cooling a solution and filtering the crystals from the mother liquor may be rapidly dried to a low moisture content without evidence of case-hardening.

The following is offered as a possible explanation for the improvement in drying pebbled ammonium nitrate melts obtainable through use of the processes of this invention. It appears probable that in cooling the pebbled material from above to below 32° C. a change in crystal form of the solid ammonium nitrates takes place with an increase in its density. As a result thereof, it is believed minute fissures are opened up in the individual pebbles. The fissures thus formed, without having any substantial effect upon the strength of the pebbles, are believed to permit relatively rapid escape of moisture from the interior of the pebbles during the subsequent drying and prevent the pebbles from being broken or blistered even when subjected to vigorous drying conditions. It is to be understood this probable explanation of the effect of the cooling step of my invention is offered without limiting the invention thereto.

I claim:

1. In a process wherein an ammonium nitrate melt containing water is pebbled by dispersion into a cooling gas to form solidified pebbles during the free fall of the dispersed material through the gas and the pebbled material is then dried, that improvement which comprises collecting the pebbles while they are still at temperatures above 32° C., passing the thus collected pebbles and a cooling medium in heat transfer relationship with each other and thereby cooling said pebbles to a temperature below 32° C. and then drying the pebbles at temperatures above 32° C., the aforedescribed steps of collecting, cooling and drying said pebbles being associated in a unitary process wherein the water removed by said drying is water originally in said ammonium nitrate melt.

2. In a process wherein an ammonium nitrate melt containing water is pebbled by dispersion into a cooling gas to form solidified pebbles during the free fall of the dispersed material through the gas and the pebbled material is then dried, that improvement which comprises collecting the pebbles while they are still at temperatures above 32° C., passing the thus collected pebbles and a cooling medium in heat transfer relationship with each other and thereby cooling said pebbles to a temperature of about 25° C. and then drying the pebbles at temperatures of about 50° to 130° C., the aforedescribed steps of collecting, cooling and drying said pebbles being associated in a unitary process wherein the water removed by said drying is water originally in said ammonium nitrate melt.

3. The process for the production of pebbled ammonium nitrate which comprises dispersing a melt of ammonium nitrate containing water into a cooling gas in the form of droplets which, during their free fall through said cooling gas, are solidified to form pebbles of a size such that at least 25% would be retained on a 20 mesh screen, collecting the solidified pebbles while they are still at temperatures above 32° C. and contain more than 1% water, passing the thus collected pebbles and a cooling medium in heat transfer relationship with each other and thereby cooling said pebbles to a temperature below 32° C. and thereafter drying the pebbles at temperatures above 50° C. to reduce their moisture content to below 1%, the aforedescribed steps of collecting, cooling and drying said pebbles being associated in a unitary process wherein the water removed by said drying is water originally in said ammonium nitrate melt.

4. In a process wherein a molten ammonium nitrate containing dispersed therein a solid finely divided material is pebbled by dispersion into a cooling gas to form solidified pebbles during the free fall of the dispersed material through the gas and the pebbled material is then dried, that improvement which comprises collecting the pebbles while they are still at temperatures above 32° C., passing the thus collected pebbles and a cooling medium in heat transfer relationship with each other and thereby cooling said pebbles to a temperature below 32° C. and then drying the pebbles at temperatures above 32° C., the aforedescribed steps of collecting, cooling and drying said pebbles being associated in a unitary process wherein the water removed by said drying is water originally in said ammonium nitrate melt.

5. In a process wherein a molten ammonium nitrate containing dispersed therein solid finely divided dolomite is pebbled by dispersion into a cooling gas to form solidified pebbles during the free fall of the dispersed material through the gas and the pebbled material is then dried, that improvement which comprises collecting the pebbles while they are still at temperatures above 32° C., passing the thus collected pebbles and a cooling medium in heat transfer relationship with each other and thereby cooling said pebbles to a temperature of about 25° C. and then drying the pebbles at temperatures of about 50° to 130° C., the aforedescribed steps of collecting, cooling and drying said pebbles being associated in a unitary process wherein the water removed by said drying is water originally in said ammonium nitrate melt.

6. In a process wherein a molten ammonium nitrate containing dispersed therein solid, finely divided dolomite is pebbled by dispersion into a cooling gas to form solidified pebbles during the free fall of the dispersed material through the gas and the pebbled material is then dried, that improvement which comprises dispersing a melt of ammonium nitrate containing water and said finely divided dolomite into a cooling gas in the form of droplets which, during their free fall through said cooling gas, are solidified to form pebbles of a size such that at least 25% would be retained on a 20 mesh screen, collecting the solidified pebbles while they are still at temperatures above 32° C. and contain more than 1% water, passing the thus collected pebbles and a cooling medium in heat transfer relationship with each other and thereby cooling said pebbles to a temperature below 32° C. and thereafter drying the pebbles at temperatures above 50° C. until their moisture content is reduced to about 0.3%, the aforedescribed steps of collecting, cooling and drying said pebbles being associated in a unitary process wherein the water removed by said drying is water originally in said ammonium nitrate melt.

7. In a process wherein an ammonium nitrate melt containing water is pebbled by dispersion into a cooling gas to form solidified pebbles during the free fall of the dispersed material through the gas and the pebbled material is then dried to remove water originally in said ammonium nitrate melt, that improvement which comprises collecting the pebbles while they are still at temperatures above 32° C. and contain more than 1% water, cooling the thus collected pebbles to a temperature below 32° C. while agitating them in heat transfer relationship to a cooling medium and then drying the pebbles at temperatures above 32° C. and thereby removing from the pebbles water originally in said ammonium nitrate melt until their moisture content is reduced to below 1%.

8. The process for the production of pebbled ammonium nitrate which comprises dispersing a melt of ammonium nitrate containing water into a cooling gas in the form of droplets which, during their free fall through said cooling gas, are solidified to form pebbles of a size such that at least 25% would be retained on a 20 mesh screen, collecting the solidified pebbles while they are still at temperatures above 32° C. and contain more than 1% water, passing cooling air in direct contact with the thus collected pebbles until they are cooled to a temperature below 32° C. while agitating the pebbles and then drying the pebbles at temperatures above 32° C. and thereby removing from the pebbles water originally in said ammonium nitrate melt until their moisture content is reduced to below 1%.

9. In a process wherein an ammonium nitrate melt containing water is pebbled by dispersion into a cooling gas to form solidified pebbles during the free fall of the dispersed material through the gas and the pebbled material is then dried to remove water originally in said ammonium nitrate melt, that improvement which comprises collecting the pebbles while they are still at temperatures above 32° C., cooling the thus collected pebbles to a temperature below 32° C. while agitating them in heat transfer relationship to a cooling medium and then drying the pebbles at temperatures above 32° C. and thereby removing from the pebbles water originally in said ammonium nitrate melt.

10. The process for the production of pebbled ammonium nitrate which comprises dispersing a melt of ammonium nitrate containing water into a cooling gas in the form of droplets which, during their free fall through said cooling gas, are solidified to form pebbles of a size such that at least 25% would be retained on a 20 mesh screen, collecting the solidified pebbles while they are still at temperatures above 32° C., passing cooling air in direct contact with the thus collected pebbles until they are cooled to a temperature of about 25° C. while agitating the pebbles and then drying the pebbles at temperatures of about 50° to 130° C. and thereby removing from the pebbles water originally in said ammonium nitrate melt.

RICHARD C. DATIN.